US011907088B2

(12) United States Patent
Mendelson et al.

(10) Patent No.: US 11,907,088 B2
(45) Date of Patent: Feb. 20, 2024

(54) TESTING OF HARDWARE QUEUE SYSTEMS USING ON DEVICE TEST GENERATION

(71) Applicant: Synopsys, Inc., Sunnyvale, CA (US)

(72) Inventors: Hillel Mendelson, Melbourne (AU); Tom Kolan, Haifa (IL); Hagai Hadad, Ga'aton (IL); Shay Aviv, Haifa (IL)

(73) Assignee: Synopsys, Inc., Sunnyvale, CA (US)

( * ) Notice: Subject to any disclaimer, the term of this patent is extended or adjusted under 35 U.S.C. 154(b) by 142 days.

(21) Appl. No.: 17/551,482

(22) Filed: Dec. 15, 2021

(65) Prior Publication Data

US 2023/0185685 A1      Jun. 15, 2023

(51) Int. Cl.
*G06F 11/273*      (2006.01)
*G06F 11/22*       (2006.01)
*G06F 11/263*      (2006.01)

(52) U.S. Cl.
CPC ........ *G06F 11/2236* (2013.01); *G06F 11/263* (2013.01); *G06F 11/273* (2013.01)

(58) Field of Classification Search
CPC ... G06F 11/2236; G06F 11/263; G06F 11/273
See application file for complete search history.

(56) References Cited

U.S. PATENT DOCUMENTS

| | | | | |
|---|---|---|---|---|
| 7,673,208 B2* | 3/2010 | Seuring | ............... | G06F 11/2242 714/724 |
| 8,296,694 B1* | 10/2012 | Chakravadhanula | ....................... | G06F 30/327 716/103 |
| 8,380,966 B2* | 2/2013 | Codrescu | ............ | G06F 11/3656 712/32 |
| 9,087,037 B2 | 7/2015 | Patil et al. | | |
| 9,262,303 B2 | 2/2016 | Schalick et al. | | |
| 9,432,288 B2 | 8/2016 | Barner et al. | | |
| 9,858,371 B1 | 1/2018 | Ovadia | | |
| 2013/0268808 A1* | 10/2013 | Patil | ................. | G06F 11/2242 714/32 |
| 2016/0216327 A1* | 7/2016 | Napolitano | .... | G01R 31/318572 |
| 2016/0238657 A1* | 8/2016 | Czamara | ............ | G01R 31/2834 |
| 2018/0307654 A1* | 10/2018 | Liszewski | ............... | G06F 21/44 |
| 2019/0170821 A1* | 6/2019 | Mueller-Schniek | ........ | G01R 31/318508 |

FOREIGN PATENT DOCUMENTS

CN       102567149 A       7/2012
WO   WO-2007098426 A2 *  8/2007  ......... G01R 31/2894

OTHER PUBLICATIONS

Kolan et al., "Post-Silicon Validation of the IBM POWER9 Processor", Proceedings of the 23rd Conference on Design, Automation and Test in Europe, Mar. 2020, 4 pages.

(Continued)

*Primary Examiner* — Joseph O Schell
(74) *Attorney, Agent, or Firm* — Fenwick & West LLP (57) ABSTRACT

An example system includes a processor that can receive a queue testing package. The processor can divide a hardware (HW) queue system to be tested into different types of queues. The processor can also generate a test using the different types of queues. The processor can further execute multiple instances of the generated test. The processor can also further compare results of the multiple instances of the test to detect a hardware fault in the hardware queue system.

20 Claims, 4 Drawing Sheets

(56) References Cited

OTHER PUBLICATIONS

Laouamri et al., "Hardware-based Network Management Framework for Monotoring and Testing of System-On-Chips", Telecommunications, 2005. ConTEL 2005. Proceedings of the 8th International Conference, Feb. 2005, 7 pages.

\* cited by examiner

TESTING OF HARDWARE QUEUE SYSTEMS USING ON DEVICE TEST GENERATION

BACKGROUND

The present techniques relate to post-silicon device testing. More specifically, the techniques relate to post-silicon device testing of hardware queue systems.

SUMMARY

According to an embodiment described herein, a system can include processor to divide a hardware queue system to be tested into different types of queues. The processor can also further generate a test using the different types of queues. The processor can also execute multiple instances of the generated test. The processor can also compare results of the multiple instances of the test to detect a hardware fault in the hardware queue system.

According to another embodiment described herein, a method can include dividing, via a processor, a hardware queue system to be tested into different types of queues. The method can further include generating, via the processor, a test using the different types of queues. The method can also further include executing, via the processor, multiple instances of the generated test. The method can also include comparing, via the processor, results of the multiple instances of the test to detect a hardware fault.

According to another embodiment described herein, a computer program product for testing hardware queue systems can include computer-readable storage medium having program code embodied therewith. The computer readable storage medium is not a transitory signal per se. The program code executable by a processor to cause the processor to divide a hardware queue system to be tested into different types of queues. The program code can also cause the processor to generate a test using the different types of queues. The program code can also cause the processor to execute multiple instances of the generated test. The program code can also cause the processor to compare results of the multiple instances of the test to detect a hardware fault in the hardware queue system.

DETAILED DESCRIPTION

Specialized system-on-chips (SoCs) may contain hardware (HW) queueing systems used for a variety of purposes. For example, the HW queueing systems may be used to pass items in time from a thread to itself in single-thread applications and between threads in multi-thread applications. In some examples, HW queueing systems can be used to manage work items in HW. For example, HW queueing systems may be used for process scheduling. In addition, HW queueing systems may be used for virtual channels for message passing between HW threads. In various examples, HW queueing systems may be configured to work in first-in first-out (FIFO), last-in first-out (LIFO), or any other suitable configuration.

Pre-silicon testing may include the use of checkers that can be included in VHDL code to generate stimuli for the queue and another checker on the other side of the queue can be included to check whether the stimuli results in data output. However, such VHDL solutions may not be able to be synthesized into the final design. For example, such checkers may use significant silicon space and power. Furthermore, there may be verification challenges in using multi-pass consistency checking in post-silicon testing. Traditionally, sophisticated mechanisms may be attached at the receiving end of such systems, to verify the correct flow of information has occurred. In particular, post-silicon testing may involve the generation of millions of tests to detect just a few errors.

Some verification platforms, for example post-silicon or emulation, heavily rely on multi-pass consistency checking, where end-of-test results of multiple executions of the same test case are compared. However, in such environments, random generation may be heavily constrained to preserve the test intent and correctness according to the memory consistency model. For multi-pass consistency checking, such verification platforms may need to create a deterministic scenario, which may end up with the same end-of-test results each time a test is executed, thus missing corner cases in the design that potentially contain functional bugs.

According to embodiments of the present disclosure, a system includes a processor that can receive a queue testing package. The processor can divide a hardware (HW) queue system to be tested into different types of queues. The processor can generate a test using the different types of queues. The processor can execute multiple instances of the generated test. The processor can also further compare results of the multiple instances of the test to detect a hardware fault in the hardware queue system. Thus, embodiments of the present disclosure allow post-silicon tests for hardware queue systems to be executed on-device. For example, the tests can be generated and used on the device under test to verify correctness without having to communicate with any outside server during test execution and verification. In addition, the embodiments may enable generating multiple correct, random, multi-threaded, variable, and deterministic test cases for HW queue units. The tests may also cover many window-condition cases due to the shareability of the queues. Thus, the embodiments may enable correct-by-construction tests that are easily verifiable on the platform itself, with no addition of extra hardware for snooping information on channels, etc. This enables scaling to full system on chip (SOC) testing, including on fabricated silicon, where traditionally any extra fabricated checkers are dropped, to minimize the power and area of the final design. Moreover, the embodiments may be mostly HW implementation agnostic because the embodiments rely on generation of regular requests on the tested HW, and not on any back-end access or channel-sniffing. Furthermore, the embodiments enable stress testing of the queue unit's limitations. For example, the embodiments herein may be used to test queue overflow, pace of queue operations, coverage of all operation types, etc. Finally, the embodiments enable the generation and execution of tests that imitate both real-life scenarios as well as boundary conditions, with predictable results. In particular, the end state of the system is guaranteed to be consistent across subsequent executions of the same test, as long as the initial state is the same. For example, the initial state may be empty or otherwise. Thus, there may be no need for a golden model of the queue system for comparison. As used herein, a golden model refers to a software model of the hardware often provided by manufacturers and used by software testing solutions to compare against the outcome of a test. In post-silicon on-device testing, such a golden model may not be available or may be too burdensome to run on device for similar comparison. This allows the embodiments described herein to be scaled up, in contrast to solutions that may require the use of an oracle, which is usually difficult to query for more than a handful of threads or instructions.

Figure 1:
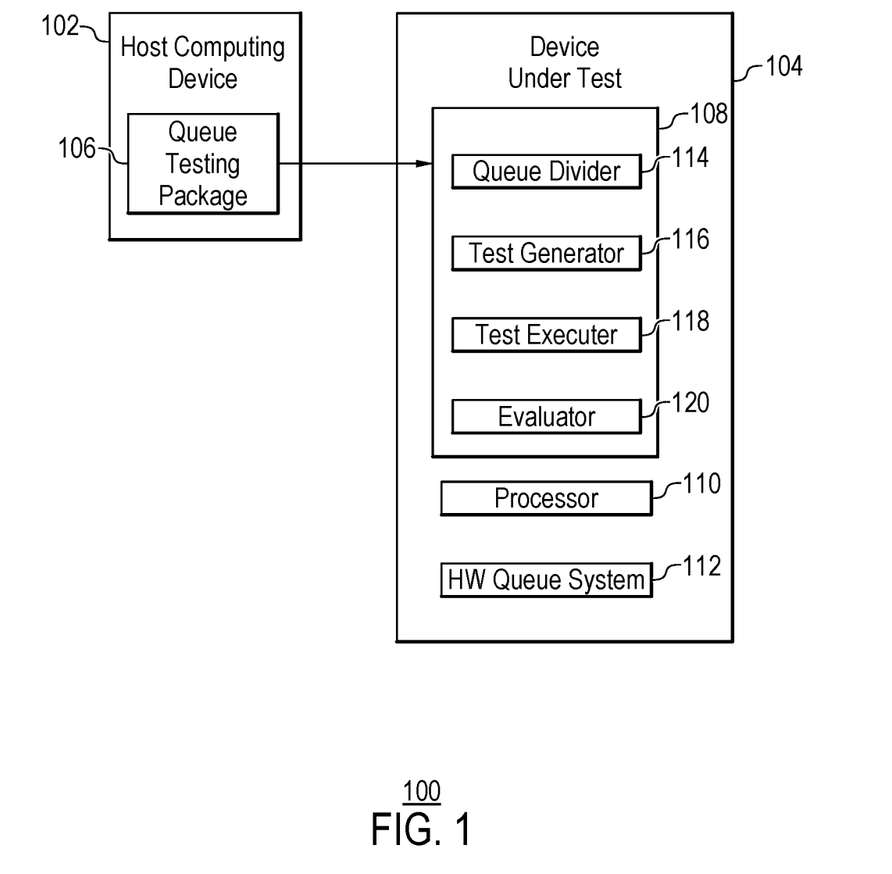
FIG. 1 is a block diagram of an example system for on-device test generation and test execution of hardware queue systems.

With reference now to FIG. 1, a block diagram shows an example system for on-device test generation and test execution of hardware queue systems. The example system is generally referred to by the reference number 100. FIG. 1 includes a host computing device 102 communicatively coupled to a device under test (DUT) 104. For example, the host computing device 102 may be the computing device 300 of FIG. 3. The host computing device 102 includes a queue testing package 106 shown being sent to the DUT 104. The DUT includes a storage 108, a processor 110, and a hardware (HW) queue system 112. The queue testing package 106 as loaded onto the storage 108 includes a queue divider 114, a test generator 116, a test executer 118, and an evaluator 120. For example, the queue divider 114, the test generator 116, the test executer 118, and the evaluator 120 may have been installed onto the DUT 104 from the queue testing package 106.

In the example of FIG. 1, the computing device may have transferred the queue testing package 106 to the DUT 104 for testing the HW queue system 112 of the DUT 104. The queue testing package 106 may be installed onto storage 108 and used to test the HW queue system 112 of the DUT 104. In general, the system 100 may treat the HW queue system 112 similarly to memory. For example, the HW queue system 112 may be treated as a shared resource that can be allocated to specific threads or shared between many threads. In addition, the HW queue system 112 may be similar to memory in that the HW queue system 112 can be stored (enqueued) to, or loaded (dequeued) from. Finally, at least in some cases, content of the HW queue system 112 may be checked at the end of test. The types of errors tested for in post-silicon testing may usually be related to timing. For example, an example post-silicon error may include an instruction that may have been sent to a specific part of the DUT 104 and no response is received, or a response to the instruction may have arrived later than expected. Moreover, such errors may have an occurrence of one in a million cycles. Thus, pre-silicon simulations with a limited set of cycles may have not detected such potential errors.

In various examples, the queue divider 114 may divide the queues in the HW queue system 112 into several types. For example, in dividing the HW queue system 112 into different types of queues, the queue divider 114 may enable hardware-identical queues in the HW queue system 112 to be assigned different roles and thus treated differently for purposes of testing. As one example, if the HW queue system 112 can handle 1000 queues, then the 1000 queues may be divided to be tested among different test threads and some of the queues may be shared by two or more threads. In various examples, the different types of queues may cover the different states and access methods of the HW queue system 112. For example, the queue types may include owned queues, unowned queues, reserved queues, and shared queues.

In various examples, one queue type in the different queue types may be an owned queue. Owned queues may be owned by specific HW threads, to be used by them for pseudo-random enqueue and dequeue, which may not be interfered by other threads. In various examples, any kind of operation may be performed on an owned queue. In some examples, even technically illegal operations may be executed on an owned queue for purposes of comparing their outcomes. For example, the owned queue may be cleared before executing the same illegal operation again. As one example, a queue that is full may reject additional requests to enqueue additional data. In various examples, each owned queue is owned by a specific HW thread, and thus suited for random operations of the specific thread only. Their content may be the same across all executions of the same test-case, and therefore the state of a queue can be compared at the end-of-test. For example, the actual data that in a queue may be compared as well as any status bits that may or may not have been enabled during the test may also be compared. In various examples, status bits may include values such as "locked," "full," "valid," among other values. In some examples, threads are allowed to dequeue from empty owned queues, and enqueue to full owned queues. For example, a lost batch of data may always be the same across executions of the same test. In various examples, locking and unlocking of owned queues may always be allowed by the owner thread, thus enabling testing of atomicity. In some examples, queue properties such as full queue behavior may be allowed to change on owned queues. In addition, owned queues may have true sharing options. For example, other threads may be allowed to peek into owned queues because this operation does not change the state of the owned queue. However, the information may be masked, because the state of the owner thread program may be unknown to the other threads. Such peeking may be used to generate stress on the owned queue for testing. In some examples, threads may also be able to write onto other-owned queues, providing that the threads do so atomically and clear out their data. Allowing threads to write into other-owned queues may enable true sharing. In some examples, if LIFO ordering is permitted, then an enqueue and lock directly followed by a dequeue and unlock may also be allowed for owned queues by another thread that is not the owner. For example, this order of operations may not disrupt the operation of the queue-owner thread and may preserve consistency across executions.

Another type of queue in the different queue types may include an unowned queue type. For example, an unowned queue may be used by all the threads in a system. In various examples, unowned queues may be used during testing to create more stress on a queue unit. All queue operations may be allowed on unowned queues. However, the content of unowned queues may be indeterministic. Thus, the content of unowned queues cannot be compared for correctness. Additionally, if an operation is a dequeue from an unowned queue, then the result may be immediately masked. For example, the test generator 116 can insert a mask instruction into such test such that the result is immediately masked during text execution.

An additional queue in the types of queues may a reserved queue. Reserved queues may be used in user-directed testing scenarios. For example, reserved queues may be used for true sharing. In true sharing, many threads may deterministically access a single queue. In some examples, reserved queues may be used in a scenario where a single message may be passed between several queues.

Another queue in the types of queues may be a shared queue. In various examples, all threads may be permitted to use these queues providing that the threads adhere to a set of rules. For example, the set of rules may be the following rules. Shared queue may use only enqueue-dequeue pairs by each thread. In other words, in various examples, each thread may use an identifier to identify its data in the shared queue. In some examples, the identifier may be included as metadata that indicates a thread that queued the data or a channel ID. In some examples, the identifier may be queued data itself. For example, a shared queue may have an enqueue entry with "My Thread ID" as its data, where the ID corresponds to a particular thread enqueueing the data. At test time, the particular thread can poll for dequeuing only entries with "My Thread ID" or poll for its unique metadata. The threads can thus discern their own entries by use of meta-data, if it exists in the design, or by using the entries themselves to store the thread information. For example, actual data may be irrelevant for testing, so such data may be replaced with identification information. In various examples, entries that are not owned by a thread may only be peeked at, but not dequeued, thus adding further stress on the HW queue system 112. In such cases, the thread may infinitely retry the operation, until its entry appears, or it may cause inconsistent operation. Even if an entry of one thread is mixed with entries of other threads, some other thread may eventually dequeue its entry, thus promoting the one thread's entry to the front of the queue and allowing entry to eventually be dequeued. In some examples, assuming each thread is enqueuing a maximum of X entries in each such transaction, then each thread may wait a maximum of X*(number of threads-1) entries, before its entries become available. This liveness property may be verified by the system 100. In various examples, if a thread enqueues onto a full queue, then the thread must infinitely retry the operation, or data may be lost, and this may cause inconsistency. In some examples, random noise may be inserted between the enqueues and dequeues of each transaction, if the number and order of the enqueues and dequeues are conserved. In various examples, in systems where it is possible to access queues in both FIFO and LIFO order, one ordering per queue may be jointly selected to maintain correct operation. For example, all threads may jointly select the same ordering per queue. In systems where LIFO ordering is permitted, an enqueue and lock of shared queues may be allowed as long as it is followed by a dequeue and unlock". This may not disrupt the operations of other threads as described above and can safely be mixed with other non-locking accesses. The shared queue type thus enables lockless, true-sharing of the HW queue system 112. However, in FIFO ordered queues, locking may not be possible, as any reordering of the threads may immediately stall the system.

Still referring to FIG. 1, the test generator 116 can generate tests to be executed on the DUT 104 using the different types of queues. For example, once this splitting to different queue types is done, each instruction generation by can randomly use any single queue of any of the above types, which may operate according to the rules described above. In various examples, an infinitely large number of such instructions may thus be generated on the DUT, by any of the threads, and executed in any order, because the generated instructions may be correct by construction. In some examples, each thread may run a copy of the test generator 116 to generate its own test in a semi-synchronized manner with the other threads in the system 100, thus allowing for maximum parallelism and utilization of the DUT 104. In some examples, the test generator 116 can simultaneously generate multiple test-cases which are markedly different from each other, by different threads.

The test executer 118 can execute the generated tests. For example, the test executer 118 can concurrently execute the generated tests using a multi-threaded system, served by the same Queue Controller(s) (not shown). In various examples, correct-by-design true and false sharing of the HW queue system 112 may be implemented using the different queue types, enabling multiple random or directed scenarios to be executed during testing. Moreover, dividing the HW queue system 112 by types of queues may enable testing without any coordination or orchestration between different threads. For example, a set of rules may be provided for the threads, and each thread may independently follow the rules during testing to prevent any collisions from occurring. Moreover, if collisions occur, then such collisions may be handled. For example, the system 100 may include interrupt handlers to enable handling of HW raised exceptions, making the tests indifferent to the start state of the DUT 104, and repeatable. For example, the tests may support handling of exceptions such as a dequeue from empty queue, or an attempted enqueue to a full queue. In various examples, test executer 118 can repeat tests after reinitializing the DUT 104 to slightly different states.

As one example test, one thread may lock a queue to write data to the queue, read the data at a later point in time, then unlock the queue. A second thread attempting to access the shared queue in this window of time may fail to access the shared queue because the shared queue is locked. In various examples, the second thread may handle such exception by waiting and retrying again at a later time. The test may then be able to be completed correctly.

As another example, a hardware fault may be receiving a locked signal despite a queue not actually being locked. In this example, the system 100 may retry accessing the queue with the same data to create a hardware fault. Thus, all the testing may be correct by design, such that a thread may not fail unless there is an actual fault in the hardware of the DUT 104.

The evaluator 120 can compares results of the multiple instances of the test to detect a hardware faults in the hardware queue system. For example, the repeatability of the generated tests enable for a multi-pass comparison of results. Such a multi-pass comparison makes the use of a golden model redundant.

It is to be understood that the block diagram of FIG. 1 is not intended to indicate that the system 100 is to include all of the components shown in FIG. 1. Rather, the system 100 can include fewer or additional components not illustrated in FIG. 1 (e.g., additional client devices, or additional resource servers, etc.). For example, additional DUTs 104 may be included in the system. In some examples, the same test may be performed in parallel on the additional DUTs 104. For example, the results of the tests across different DUTs may be compared to detect hardware issues. In various examples, different tests may be executed across similarly configured DUTs. For example, a greater number of tests may be executed and evaluated by splitting the tests across multiple DUTs 104.

Figure 2:
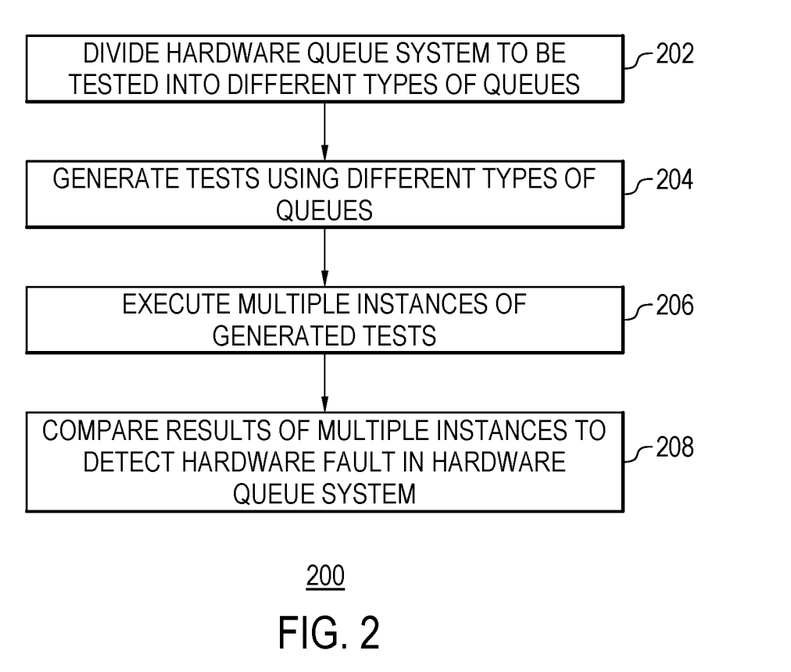
FIG. 2 is a process flow diagram of an example method that can generate and execute on device tests of hardware queue systems.

FIG. 2 is a process flow diagram of an example method that can generate and execute on device tests of hardware queue systems. The method 200 can be implemented with any suitable computing device, such as the computing device 300 of FIG. 3 and is described with reference to the system 100 of FIG. 1. For example, the methods described below can be implemented by the processor 110 or the processor 402 of FIGS. 1 and 4.

At block 202, a processor divides a hardware queue system to be tested into different types of queues. For example, the different types of queues may include an owned queue, an unowned queue, a reserved queue, and a shared queue.

At block 204, the processor generates tests using the different types of queues. For example, the processor can generate constrained-random or fully random tests that utilize the different types of queues. In some examples, the processor can include an identifier corresponding to a particular thread in data to be enqueued in an executed test.

At block 206, the processor executes multiple instances of the generated tests. For example, the processor can execute the multiple instances of the generated test in parallel on different parts of the hardware queue system. In some examples, the processor can execute the multiple instances of the generated test in parallel on different identical parts of the hardware queue system. In various examples, the processor can execute the multiple instances of the generated test in series on the same portions of the hardware queue system.

At block 208, the processor compares results of the multiple instances of the test to detect a hardware fault in the hardware queue system. For example, the processor may execute a multi-pass comparison.

The process flow diagram of FIG. 2 is not intended to indicate that the operations of the method 200 are to be executed in any particular order, or that all of the operations of the method 200 are to be included in every case. Additionally, the method 200 can include any suitable number of additional operations. For example, the processor can execute an instance of the multiple instances of the generated test, where the instance is associated with multiple instances of the generated test are executed in parallel on different hardware queue systems of separate devices under test. In some examples, additional instance of a test may be generated in response to detecting HW queue system fault in order to verify the detected hardware faults.

Figure 3:
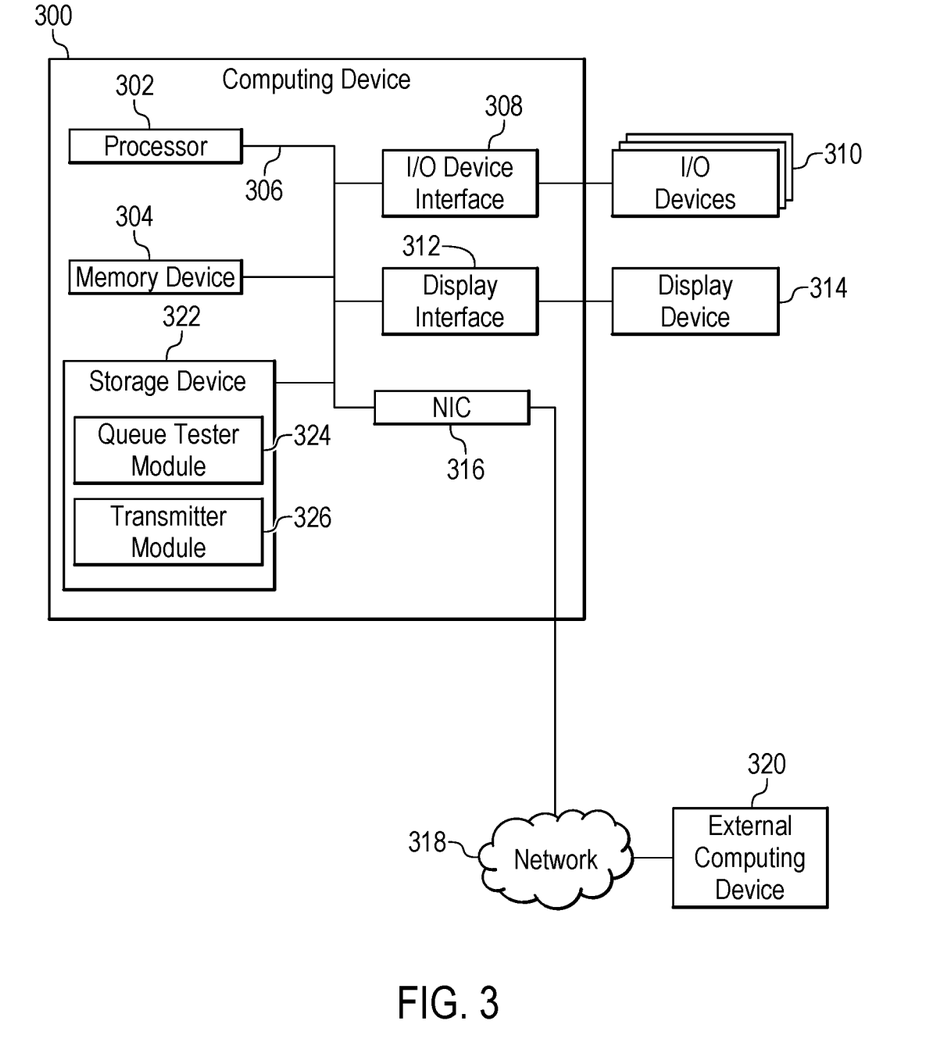
FIG. 3 is a block diagram of an example computing device that can enable on-device test generation and test execution of hardware queue systems.

FIG. 3 is block diagram of an example computing device that can enable on-device test generation and test execution of hardware queue systems. The computing device 300 may be for example, a server, desktop computer, laptop computer, tablet computer, or smartphone. In some examples, computing device 300 may be a cloud computing node. Computing device 300 may be described in the general context of computer system executable instructions, such as program modules, being executed by a computer system. Generally, program modules may include routines, programs, objects, components, logic, data structures, and so on that perform particular tasks or implement particular abstract data types. Computing device 300 may be practiced in distributed cloud computing environments where tasks are performed by remote processing devices that are linked through a communications network. In a distributed cloud computing environment, program modules may be located in both local and remote computer system storage media including memory storage devices.

The computing device 300 may include a processor 302 that is to execute stored instructions, a memory device 304 to provide temporary memory space for operations of said instructions during operation. The processor can be a single-core processor, multi-core processor, computing cluster, or any number of other configurations. The memory 304 can include random access memory (RAM), read only memory, flash memory, or any other suitable memory systems.

The processor 302 may be connected through a system interconnect 306 (e.g., PCI®, PCI-Express®, etc.) to an input/output (I/O) device interface 308 adapted to connect the computing device 300 to one or more I/O devices 310. The I/O devices 310 may include, for example, a keyboard and a pointing device, wherein the pointing device may include a touchpad or a touchscreen, among others. The I/O devices 310 may be built-in components of the computing device 300, or may be devices that are externally connected to the computing device 300.

The processor 302 may also be linked through the system interconnect 306 to a display interface 312 adapted to connect the computing device 300 to a display device 314. The display device 314 may include a display screen that is a built-in component of the computing device 300. The display device 314 may also include a computer monitor, television, or projector, among others, that is externally connected to the computing device 300. In addition, a network interface controller (NIC) 316 may be adapted to connect the computing device 300 through the system interconnect 306 to the network 318. In some embodiments, the NIC 316 can transmit data using any suitable interface or protocol, such as the internet small computer system interface, among others. The network 318 may be a cellular network, a radio network, a wide area network (WAN), a local area network (LAN), or the Internet, among others. An external computing device 320 may connect to the computing device 300 through the network 318. In various examples, external computing device 320 may be device under test (DUT including any number of hardware queue systems. For example, the external computing device 320 may be the DUT 104 of FIG. 1.

The processor 302 may also be linked through the system interconnect 306 to a storage device 322 that can include a hard drive, an optical drive, a USB flash drive, an array of drives, or any combinations thereof. In some examples, the storage device may include a queue tester module 324 and a transmitter module 326. The queue tester module 324 may include code for on-device testing a hardware queue system, such as a device under test with a hardware queue. For example, the queue tester module 324 can receive a queue testing package. The queue tester module 324 can divide a hardware queue system to be tested into different types of queues. The queue tester module 324 can generate a test using the different types of queues. In some examples execute multiple instances of the generated test. The module 324 may then compare results of the multiple instances of the test to detect a hardware fault in the hardware queue system. The transmitter module 326 can transmit the queue tester module 324 to the external computing device 320 for execution of the queue tester module 324 on the external computing device 320.

It is to be understood that the block diagram of FIG. 3 is not intended to indicate that the computing device 300 is to include all of the components shown in FIG. 3. Rather, the computing device 300 can include fewer or additional components not illustrated in FIG. 3 (e.g., additional memory components, embedded controllers, modules, additional network interfaces, etc.). For example, in some embodiments, the external computing device 320 can be more directly connected to the computing device 300 via the I/O device interface 308. Furthermore, any of the functionalities of the queue tester module 324, and the transmitter module 326, may be partially, or entirely, implemented in hardware and/or in the processor 302. For example, the functionality may be implemented with an application specific integrated circuit, logic implemented in an embedded controller, or in logic implemented in the processor 302, among others. In some embodiments, the functionalities of the queue tester module 324, and the transmitter module 326 can be implemented with logic, wherein the logic, as referred to herein, can include any suitable hardware (e.g., a processor, among others), software (e.g., an application, among others), firmware, or any suitable combination of hardware, software, and firmware.

The present invention may be a system, a method and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the techniques. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 4:
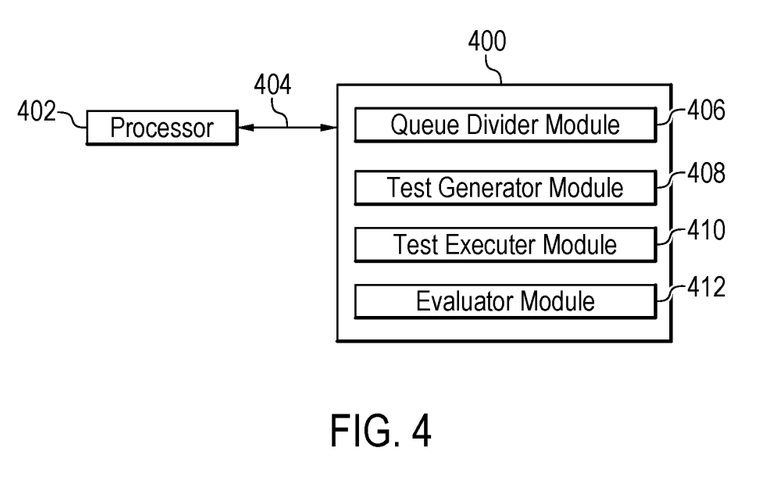
FIG. 4 is an example tangible, non-transitory computer-readable medium that can generate and execute on-device tests of hardware queue systems.

Referring now to FIG. 4, a block diagram is depicted of an example tangible, non-transitory computer-readable medium 400 that can generate and execute on-device tests of hardware queue systems. The tangible, non-transitory, computer-readable medium 400 may be accessed by a processor 402 over a computer interconnect 404. Furthermore, the tangible, non-transitory, computer-readable medium 400 may include code to direct the processor 402 to perform the operations of the method 200 of FIG. 2.

The various software components discussed herein may be stored on the tangible, non-transitory, computer-readable medium 400, as indicated in FIG. 4. For example, a queue divider 406 includes code to divide a hardware (HW) queue to be tested into different types of queues. For example, the module 406 may include code to divide the hardware queue system into an owned queue, an unowned queue, a reserved queue, and a shared queue. A test generator module 408 includes code to generate a test using the different types of queues. In some examples, the test generator module 408 includes code to include an identifier corresponding to a particular thread in data to be enqueued in an executed test. A test executor module 410 includes code to execute multiple instances of the generated test. In some examples, the test executor module 410 also includes code to execute the multiple instances of the generated test in parallel on different parts of the hardware queue system. In some examples, the test executor module 410 also includes code to execute the multiple instances of the generated test in parallel on different identical parts of the hardware queue system. In some examples, the test executor module 410 also includes code to execute the multiple instances of the generated test in series on the same portions of the hardware queue system. An evaluator module 812 includes code to compare results of the multiple instances of the test to detect a hardware fault in the hardware queue system.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. It is to be understood that any number of additional software components not shown in FIG. 4 may be included within the tangible, non-transitory, computer-readable medium 400, depending on the specific application.

The descriptions of the various embodiments of the present techniques have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising a processor to:
    divide a hardware queue system to be tested into different types of queues, wherein the hardware queue system comprises a plurality of queues and dividing the hardware queue system comprises dividing the plurality of queues into different types of queues;
    generate a test of the plurality of queues, wherein the test is executed using the different types of queues;
    execute multiple instances of the generated test using the different types of queues; and
    compare results of the multiple instances of the test to detect a hardware fault in the hardware queue system.

2. The system of claim 1, wherein the multiple instances of the generated test are executed in parallel on different parts of the hardware queue system.

3. The system of claim 1, wherein the multiple instances of the generated test are executed in parallel on different identical parts of the hardware queue system.

4. The system of claim 1, wherein the multiple instances of the generated test are executed in series on a same portion of the hardware queue system.

5. The system of claim 1, wherein the multiple instances of the generated test are executed in parallel on different hardware queue systems of separate devices under test.

6. The system of claim 1, wherein the queue types comprise an owned queue type.

7. The system of claim 1, wherein the queue types comprise an unowned queue type.

8. The system of claim 1, wherein the queue types comprise a reserved queue type.

9. The system of claim 1, wherein the queue types comprise a shared queue type.

10. A computer-implemented method, comprising:
    dividing, via a processor, a hardware queue system to be tested into different types of queues, wherein the hardware queue system comprises a plurality of queues and dividing the hardware queue system comprises dividing the plurality of queues into different types of queues;
    generating, via the processor, a test of the plurality of queues, wherein the test is executed using the different types of queues;
    executing, via the processor, multiple instances of the generated test using the different types of queues; and
    comparing, via the processor, results of the multiple instances of the test to detect a hardware fault in the hardware queue system.

11. The computer-implemented method of claim 10, comprising executing, via the processor, the multiple instances of the generated test in parallel on different parts of the hardware queue system.

12. The computer-implemented method of claim 10, comprising executing, via the processor, the multiple instances of the generated test in parallel on different identical parts of the hardware queue system.

13. The computer-implemented method of claim 10, comprising executing, via the processor, the multiple instances of the generated test in series on a same portion of the hardware queue system.

14. The computer-implemented method of claim 10, wherein dividing the hardware queue system into different types of queues comprises dividing the hardware queue system into an owned queue, an unowned queue, a reserved queue, and a shared queue.

15. The computer-implemented method of claim 10, further comprising including an identifier corresponding to a particular thread in data to be enqueued in an executed test.

16. A computer program product for testing hardware queue systems, the computer program product comprising a computer-readable storage medium having program code embodied therewith, wherein the computer-readable storage medium is not a transitory signal per se, the program code executable by a processor to cause the processor to:
    divide a hardware queue system to be tested into different types of queues, wherein the hardware queue system comprises a plurality of queues and dividing the hardware queue system comprises dividing the plurality of queues into different types of queues;

generate a test of the plurality of queues, wherein the test is executed using the different types of queues;
execute multiple instances of the generated test using the different types of queues; and
compare results of the multiple instances of the test to detect a hardware fault in the hardware queue system.

17. The computer program product of claim 16, further comprising program code executable by the processor to execute the multiple instances of the generated test in parallel on different identical parts of the hardware queue system.

18. The computer program product of claim 16, further comprising program code executable by the processor to execute the multiple instances of the generated test in series on a same portion of the hardware queue system.

19. The computer program product of claim 16, further comprising program code executable by the processor to include an identifier corresponding to a particular thread in data to be enqueued in an executed test.

20. The computer program product of claim 16, further comprising program code executable by the processor to divide the hardware queue system into an owned queue, an unowned queue, a reserved queue, and a shared queue.

* * * * *